United States Patent Office 2,857,178
Patented Oct. 21, 1958

2,857,178
HEAT FLOWABLE CONNECTING MEANS FOR PIPES AND TUBES

Raymond J. Mitchell, Collingham, near Leeds, England

Application May 13, 1953, Serial No. 354,675

2 Claims. (Cl. 285—287)

This invention relates to connecting or coupling means for pipes or tubes of the kind wherein telescopic connection is afforded between the pipes or tubes to be connected and a tubular connecting piece or socket afforded by a pipe-fitting in which a clearance is provided between the pipe and tubular connecting piece of a size to induce capillary action of molten solder or brazing alloy, the solder or brazing alloy hitherto being carried in solid form by one or more annular recesses in the tubular connecting piece and being melted by the application of heat after the connecting piece and pipe or pipes have been telescopically engaged and the usual precautions taken regarding metallic cleanliness and the use of suitable flux well known to those engaged in the art being assumed.

Hitherto the annular recess or recesses have been of fixed dimensions by being formed in the internal bore surface of the connecting piece or at the outer end or ends of the connecting piece or having external end-cap or ferrule to complete the formation of each annular groove in which case the solder or brazing alloy ring is necessarily situated very near the outer end of the coupling.

The object of the present invention is to provide a new method of connecting or coupling pipes of any material of which tubes or pipes can be made such as aluminum, aluminum alloys, ceramic, plastics or glass, also copper tubing and its alloys without the use of solder or brazing alloy.

A further object of the present invention is to provide a new or improved construction of connecting piece for tubes or pipes and method of accommodating the bonding medium therein, applicable to a connecting piece providing one or more outlets or connections from the same body.

According to the invention means are provided whereby the volumetric capacity of the annular recess or recesses can be reduced and cause the displacement therefrom of thermoplastic bonding material so that the capillary action of said bonding material can be positively controlled and assisted, said means forming an integral part of the joint when made. The annular recess or recesses in the tubular connecting piece is or are formed by counter-boring the inner surface of the outer end or ends of the tubular connecting piece the outer wall of each recess being formed by a sleeve which is capable of fitting wholly or partly into the counter-bore. Alternatively the recess for the bonding medium may be partly formed in an inner sleeve which constitutes a spacer stop sleeve fitting in the counter-bore of the connecting piece body and is completed by an outer sleeve partly or completely housed in the counter-bore of the connecting piece. Preferably the outer sleeve, the spacer stop sleeve and the connecting piece body will have identical internal diameters so that a pipe or tube being connected passes through the outer sleeve and into the spacer stop sleeve and the connecting piece body and a capillary space is provided between the outer surface of the tube or tubes and the connecting piece body. The outer sleeve or sleeves may be a screw fit into the counter-bore of the connecting piece body.

By varying the position of the outer sleeve in the counter-bore of the connecting piece body the volume of the reces for the bonding material can be progressively reduced and hence the capillary flow of the bonding material positively assisted during its distribution into the capillary space of the joint.

In order that the invention may be clearly understood and readily carried into effect the same will now be more fully described with reference to and by the aid of the accompanying drawings, wherein.

Figure 1:
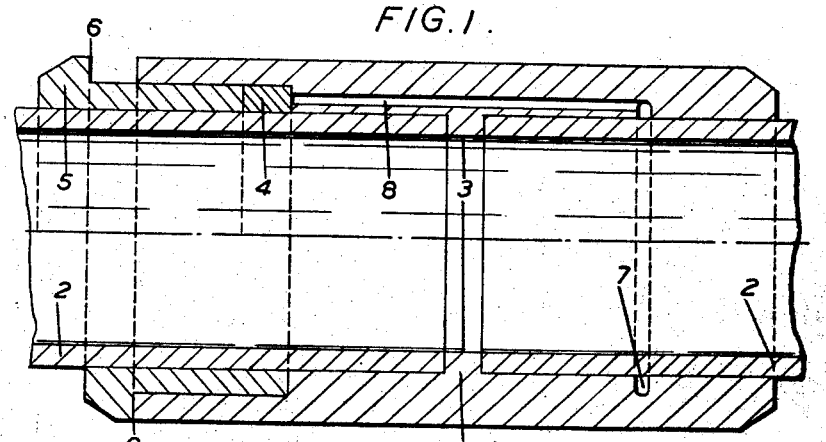
Figure 1 is a composite sectional view of half of a connecting piece constructed in accordance with one embodiment of the invention, the upper part showing the connecting piece before the joint has been made and the lower part showing the connecting piece after the joint has been completed.

Referring to Figure 1 of the drawings, the tubular connecting piece body 1 provides two axially aligned sockets in one piece, one of which is shown as receiving a pipe end 2 and the diameters of the sockets are calculated relative to the outside diameters of the pipes so that when each pipe is inserted into its socket an annular space is left such as to induce attraction of the bonding material when flowing.

At the inner end of each socket on the inside is provided a shoulder 3 to act as an abutment or stop for the pipe end 2 said shoulder 3 being equal in depth to the thickness of the pipe plus the capillary space so that interior bores of the joint and pipe are continuous or uniform throughout.

The bonding medium 4 in a solid ring form is placed in the inner end of a counter-bore formed in the outer end or ends of the socket. A sleeve 5 surrounds the pipe end 2 and enters the counterbore.

The inner face of the sleeve forms with the step in the counterbore, an annular groove of variable volume which is suitably shaped as a recess for the bonding medium ring 4. The internal diameter of the sleeve 5 will have a sufficient clearance over the external diameter of the pipe or tube 2 to permit capillary action of the bonding medium when flowing. The outer end of the sleeve 5 may have a shoulder 6 which bears against the outer end of the connecting piece body 1 when the sleeve 5 is fully inserted into the counterbore and in this connection the outer end of the sleeve may be radiused or rounded so that the complete joint has a neat stream-lined appearance. The shoulder 6 may be dispensed with if desired and the sleeve 5 may be screw threaded to screw into the end of the connecting piece body 1 so that when the bonding medium commences to flow, the sleeve 5 can be screwed into the connecting piece body and thereby positively assist and increase the capillary action of the bonding medium. The sleeve 5 may be of such length that it may be pushed into the counterbore or screwed therein when the bonding medium has melted so as to leave no space between its inner end face and the end face of the counterbore; alternatively the sleeve 5 may also be shorter and leave a clearance space. In Figure 1 a connecting piece body 1 is shown provided with two axially aligned sockets for the reception of the pipe ends 2 and the inner end of each socket is provided with or separated by a shoulder 3. One end of the connecting piece is formed with a counterbore at the inner end of which is placed the bonding medium 4 in a solid ring form. A sleeve 5 surrounds one of the pipe ends 2 and enters the counterbore.

The inner face of the sleeve forms, with the step in the counterbore, an annular groove of variable volume which is suitably shaped as a recess for the bonding material ring 4.

A further annular groove 7 is provided surrounding the pipe end 2 inserted in the connecting piece remote from the sleeve 5 and a number of ducts 8 which are disposed parallel to the axis of the connecting piece, are provided to permit the bonding medium to flow into the groove 7 and the capillary space around the pipe end as in the previous embodiment. In this embodiment one bonding medium ring suffices to unite two tube ends.

Figure 2:
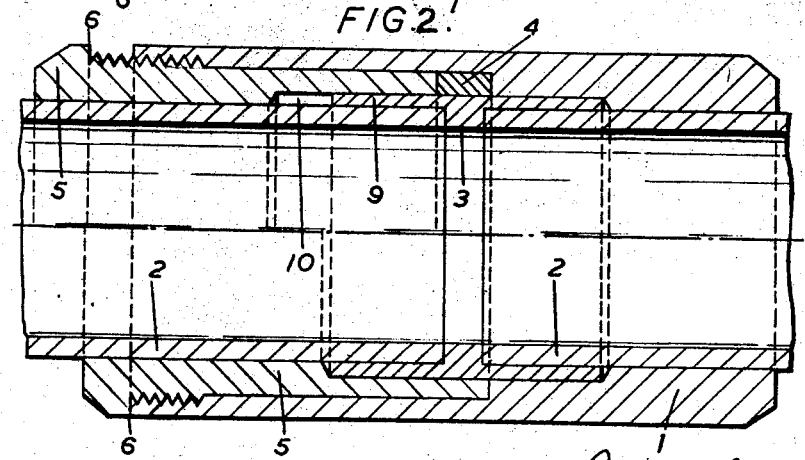
Figure 2 is a similar view to Figure 1 but showing a complete connecting piece of modified form.

In the construction shown in Figure 2 the shoulder 3 is formed on an inner sleeve 9 and to accommodate this inner sleeve 9 and the sleeve 5, the interior of the connecting piece body is formed with a three dimensioned bore and the sleeve 5 is formed with an internal annular recess 10 to enable it to pass over one end of the inner sleeve 9. The annular groove formed in the connecting piece body 1 for the bonding medium ring 4 has two sides formed by the connecting piece body, a third side formed by a portion of the external surface of the inner sleeve 9 and a fourth movable side by the inner end of the sleeve 5. The sleeve 5 will be screw threaded and screwed into the bore of the connecting piece. In this embodiment also one bonding medium ring 4 suffices to unite two tube ends.

The inner sleeve 9 ensures that the tubes are equally intruded at each end of the connecting piece body.

In all cases the movable sleeve 5 forms an integral part of the joint when it is made.

A suitable jointing or bonding material will be a non-metallic substantially solid compound such as a thermo-setting plastic material possessing the property that on heating, it softens sufficiently to flow or be caused to flow and after further heating always hardens permanently. The class of plastic described as thermo-setting compounds is a good example of the foregoing and a suitable thermo-setting compound which also possesses strong adhesive properties for nonabsorbent surfaces is ideal for our purpose herewith.

Such bonding material enables tubes of any metal, plastic or ceramic or glass to be connected either together or to other installations according to the nature of the fitting or connecting piece employed.

In a further alternative the bonding or thermo-setting plastic adhesive will be of a liquid resin form which will polymerise at temperatures below 200° C. and in some cases at normal atmospheric temperatures.

An alternative method of making joints between tubes employing the adhesive characteristics of the special resins here concerned, lies in the use of a liquid form of these resins, which possess the convenient property, when mixed with a suitable catalyser of curing or polymarising at atmosphere temperatures within normal range. In using such resins as bonding agents with couplings as described, the technique required in all cases is as follows:

Presuming the tube ends and interior of the connecting piece to be clean and degreased, the bore surface of the connecting piece is smeared with liquid resin premixed with catalyser and the end of the tube to be coupled is likewise smeared, the sleeve having been pushed over the end of the tube and moved along a few inches. The tube end is then pushed into the fitting body up against the stop, and this is followed by pushing in, or screwing in, the sleeve. It is advantageous to smear the outside of the sleeve with resin before finally screwing or pushing it to its furthest limit. The sleeve will on being screwed or pushed in, act as a displacer by shearing off all but a film of resin as it moves inwards into the connecting piece. At a certain point in this movement of the sleeve an annulus of liquid resin will be trapped, and a further movement inwards of the sleeve will extrude the liquid resin into the capillary spaces the boundaries of which form the mating surfaces which are required to be bonded. After these operations the assembly is left undisturbed for a few hours, when a congealing of the resin will indicate that polymarisation, or curing, have taken place. The operation can be accelerated by warming with a hot-air torch designed to give a strong flow of hot air within the correct temperature range.

I claim:

1. A coupling pipe assembly including a single element tubular body having a pair of longitudinally spaced plain inner annular recesses, an annular stop within the tubular body and positioned between said recesses; axially aligned plain ended pipes extending into said tubular body from opposite ends thereof and engaging said stop, said pipes being a sliding fit in said recesses, said body at one end having a counterbored portion, a ring of thermo-setting plastic resin bonding material in said counterbored portion, a sleeve movable within said counterbored portion and engaging said bonding material, said sleeve encircling one of said pipes, capillary clearances being provided between the adjacent surfaces of the body, the pipes and said sleeve, said body having at least one duct means communicating said recesses with each other and with the counterbored portion containing the thermo-setting plastic resin material, the total volume of said ring being at least substantially equal to the total volume of said capillary clearance whereby when the sleeve is moved inwardly relative to the body the bonding material is displaced through said duct means into said recesses and into the capillary clearances around the pipes to unite the coupling, sleeve and pipe ends together.

2. A coupling pipe assembly including a single element tubular body having a bore therethrough, one end of said bore having an enlarged counterbored portion, an inner sleeve in said enlarged bore portion, an annular stop formed on the inner surface of said inner sleeve intermediate the ends thereof, a pair of axially aligned plain ended pipes extending into said tubular body and inner sleeve from opposite ends thereof and engaging said stop, said pipes having a sliding fit in the bore of said body and inner sleeve, a ring of themo-setting plastic resin bonding material in said counterbored portion, a sleeve screwthreaded to screw within a corresponding screw thread in said counterbored portion and engaging said bonding material, said screwthreaded sleeve encircling one of said pipes, capillary clearances being provided between the adjacent surfaces of the body, the inner sleeve, the screwthreaded sleeve and the pipes, the total volume of said ring being at least substantially equal to the total volume of said capillary clearance whereby screwing said sleeve inwardly relative to the body causes displacement of the bonding material into said capillary clearances around the inner sleeve, screwthreaded sleeve and the pipes to unite the coupling, sleeves and pipe ends together.

References Cited in the file of this patent

UNITED STATES PATENTS

| 377,988 | Bowers | Feb. 14, 1888 |
| 503,432 | McIntyre | Aug. 15, 1893 |
| 598,857 | Coffee | Feb. 8, 1898 |
| 1,866,857 | Lindquist | July 12, 1932 |
| 1,947,581 | Cornelius | Feb. 20, 1934 |
| 2,005,189 | Herr | June 18, 1935 |
| 2,093,513 | Campbell | Sept. 21, 1937 |

FOREIGN PATENTS

| 202,927 | Switzerland | Feb. 15, 1939 |
| 523,331 | Great Britain | July 11, 1940 |